United States Patent
Yang et al.

(10) Patent No.: US 7,218,513 B2
(45) Date of Patent: May 15, 2007

(54) DISC DRIVE CARRIER UNIT

(75) Inventors: Yung-Chi Yang, Taipei (TW); Yue-Jun Hu, Taipei (TW); Mike Cai, Taipei (TW); Li-Ming Le, Taipei (TW)

(73) Assignee: Inventec Corporation (TW)

( * ) Notice: Subject to any disclaimer, the term of this patent is extended or adjusted under 35 U.S.C. 154(b) by 236 days.

(21) Appl. No.: 11/084,474

(22) Filed: Mar. 18, 2005

(65) Prior Publication Data

US 2006/0209506 A1  Sep. 21, 2006

(51) Int. Cl.
*G06F 1/16* (2006.01)
*G11B 7/095* (2006.01)

(52) U.S. Cl. .................. 361/685; 369/129; 312/223.2; 720/663

(58) Field of Classification Search ................ 369/129, 369/44.21; 312/223.1, 223.2, 294, 257.1; 463/43, 29; 720/663; 361/724–727, 679–687
See application file for complete search history.

(56) References Cited

U.S. PATENT DOCUMENTS

| | | | | |
|---|---|---|---|---|
| 6,888,718 B2 | * | 5/2005 | Nakamura | ................... 361/685 |
| 2002/0093888 A1 | * | 7/2002 | Higashihara et al. | .... 369/44.21 |
| 2002/0093889 A1 | * | 7/2002 | Higashihara et al. | .... 369/44.21 |
| 2003/0031111 A1 | * | 2/2003 | Osada et al. | ................. 369/219 |

* cited by examiner

*Primary Examiner*—Hung Van Duong
(74) *Attorney, Agent, or Firm*—Peter F. Corless; Steven M. Jensen; Edwards Angell Palmer & Dodge LLP

(57) ABSTRACT

A disc drive carrier unit installed on an installation surface of a computer casing is proposed. The installation surface has at least a first positioning piece and a first fixation piece, and both are perpendicular to each other. The disc drive carrier unit has a frame for encompassing and securing a disc drive, a second positioning piece for engaging with the first positioning piece, and at least a second fixation piece for correspondently securing to the first fixation piece. The second positioning piece of the disc drive carrier unit has an engaging function to replace the partial locking design of the conventional technology, for ease of assembly/disassembly and reduction of the assembly cost.

12 Claims, 5 Drawing Sheets

DISC DRIVE CARRIER UNIT

BACKGROUND OF THE INVENTION

1) Field of the Invention

This invention relates to an improved carrier unit, in particular, to a disc drive carrier unit for installing a disc drive within a computer casing.

2) Description of the Prior Art

A wide use of electronic information device, particularly the computer has been epidemic to users of all ages. In this highly competitive age for specialization and professionalization, the related industries regarding computer hardware design, manufacturing and assembly have to constantly come up with research idea in the common goal of lowering manufacture cost to improve their competitiveness on the marketplace. Consequently, any improvement of computer hardware structure, which offers the potential for substantial structural simplification, ease of assembly or costs reduction, is regarded as an industrial innovation to computer hardware manufacturers, as well as in conformity with the spirit of the Patent Act. In view of the foregoing, the invention provides an improvement detail of a disc drive carrier unit thereof.

Generally, a computer system is designed with a space inside the computer casing beforehand for installing a floppy disc drive, a hard disc drive, and so on. The disc drive is usually encompassed by a disc drive carrier unit and secured inside the computer casing as disclosed in the R.O.C. Utility Model Patents, No. 216664, No. 371062 and No. 421278.

As shown in FIG. 1, a conventional computer casing 1 usually has at least two disc drive frames 11 and 13 for optionally mounting a floppy disc drive, a hard disc drive, a CD-ROM drive or a DVD-ROM drive, and so on. The disc drive frame 13 has a space 15 for securing a disc drive or a CD-ROM drive therein, both sides of the disc drive frame 13 are pre-set with four mounting holes 135 (corresponding to the standard lockhole positiones of a disc drive or a CD-ROM drive) for securing a selected disc drive or a CD-ROM drive. In addition, the disc drive frame 13 has four projecting pieces 131 on both sides thereof, and each of the projecting pieces 131 has a mounting hole 133. The four projecting pieces 131 and the correspondent mounting holes 133 are used to secure the disc drive frame 13 inside one lateral side of the computer casing 1 or on the bottom surface of another disc drive frame 11 by screws or other fastening elements.

However, the computer casing 1 and the disc drive frames 11 and 13 of conventional technology are formed by the stamping technique with precision not easily controlled. In the event when the disc drive frames 11 and 13 are deformed to cause serious inaccurate positions of the projecting pieces 131 and the mounting holes 133. Consequently, this leads to misalignmnet with respective positioning holes on one lateral surface inside the computer casing 1 or on the bottom surface of another disc drive frame 11, making the assembly a defective product. And perhaps, in the event when one of the four mounting holes 133 on the projecting pieces 131 is shifted in position, the disc drive frame is also regarded as a defective product due to adjustment failure. Besides, it is not a convenient in such assembly since four screws are needed to secure a disc drive frame 13 on one lateral surface inside the computer casing 1 or on the bottom surface of another disc drive frame 11.

Moreover, the majority of a disc drive is surrounded by the disc drive frame 13, which is then secured on one lateral side inside the computer casing 1 or on the bottom surface of another disc drive frame 11, so that electromagnetic interference (EMI) is easily incurred during disc operation to harm a user's health condition, and electrostatic discharge (ESD) makes the disc drive vulnerable to additional damage from electrical overstress (EOS). Therefore, these technology drawbacks are necessary to be improved for installing related computer devices, e.g., floppy disc drive, hard disc drive, CD-ROM drive, DVD-ROM drives, etc.

In view of the foregoing, how to design a disc drive carrier unit to remove the above problems and drawbacks associated with the prior art technology, adding up the advantages of ease of assembly/disassembly, avoiding the phenomena of electromagnetic interference and electrostatic discharge with the advantages of costs reduction and decrease in rejects, has been a major concern to be solved.

SUMMARY OF THE INVENTION

In light of the drawback associated with prior art technology, one objective of the invention is to provide a disc drive carrier unit that is easily assembled and dismantled.

Another objective of the invention provides a disc drive carrier unit for reducing an assembly cost.

Another objective of the invention provides a disc drive carrier unit for reducing yield of the defective products.

Another objective of the invention provides a disc drive carrier unit that avoids electromagnetic interference and electrostatic discharge.

To achieve the aforementioned and other objectives, the invention provides a disc drive carrier unit, which is mounted on an installation surface of a computer casing. The installing surface is formed with at least a first positioning piece and a first fixation piece on the installation surface inside the computer and perpendicular to each other. The disc drive carrier unit comprises a frame for encompassing and securing a disc drive over the installation surface; a second positioning piece formed on one end of the frame for correspondently engaging with the first positioning piece; and at least a second fixation piece formed on a surface of the frame and is perpendicular to the second positioning piece for correspondingly securing to the first fixation piece.

The second positioning piece comprises a notch, by which to the second positioning piece is engaged with the first positioning piece. Preferably, the notch has a chamfer on an exterior end thereof for smoothly operating on the engaging action.

The width of the second positioning piece is smaller than that of the first positioning piece, so that the second wedging piece can shift horizontally with respect to the first positioning piece. Preferably, the width of the first positioning may be twice as long as that of the second positioning piece, so as to allow horizontal shifting of the second positioning piece within the common misalignment by stamping.

The second fixation piece has at least a mounting hole for insertion with a screw, thereby enabling the second fixation piece to be secured to the the first fixation piece. Preferably, there are two second fixation pieces, each having a mounting hole for insertion of the screw.

The frame has an "n"-shaped cross-sectional surface with all edges at right angles to one another. Preferably, the frame comprises respective mounting holes on both sides thereof corresponding in position to the respective disc drive lockholes for securing-the disc drive.

The frame, the second positioning piece and the second fixation pieces are conductive metal panels. Preferably, the metal panels are selected from a group consisting of iron, copper, nickel, alloy of nickel and copper, alloy of nickel, copper and iron, or alloy of copper, nickel and gold.

The disc drive carrier unit of the invention has the engaging function of the second positioning piece to replace the partial locking design of the prior art. Therefore, the invention provides the disc drive carrier unit that provides assembly/disassembly and cost reduction. In addition, the disc drive carrier unit allows horizontal shifting adjustment within the common misalignment by stamping, so as to reduce yield of the defective product. Moreover, the frame, the second positioning piece and the second fixation pieces are made of conductive metal panels. Therefore, the invention has additional mask effect to avoid electromagnetic interference and has the grounding function to avoid electrostatic discharge. Consequently, the invention can overcome drawbacks associated with conventional technology to enhance its industrial applicability.

The detailed embodiment of the invention is disclosed herein as a basis for the claims and as a representative basis for teaching one skilled in the art to variously practice the present invention. It is to be understood that the disclosed embodiment is merely exemplary of the present invention which may be embodied in various systems. Changes may be made in details without exceeding the scope of the invention.

DETAILED DESCRIPTION OF THE PREFERRED EMBODIMENTS

To enable a further understanding of the structural features and the technical contents of the invention, the brief description of the drawings below is followed by the detailed description of embodiment.

Figure 1:
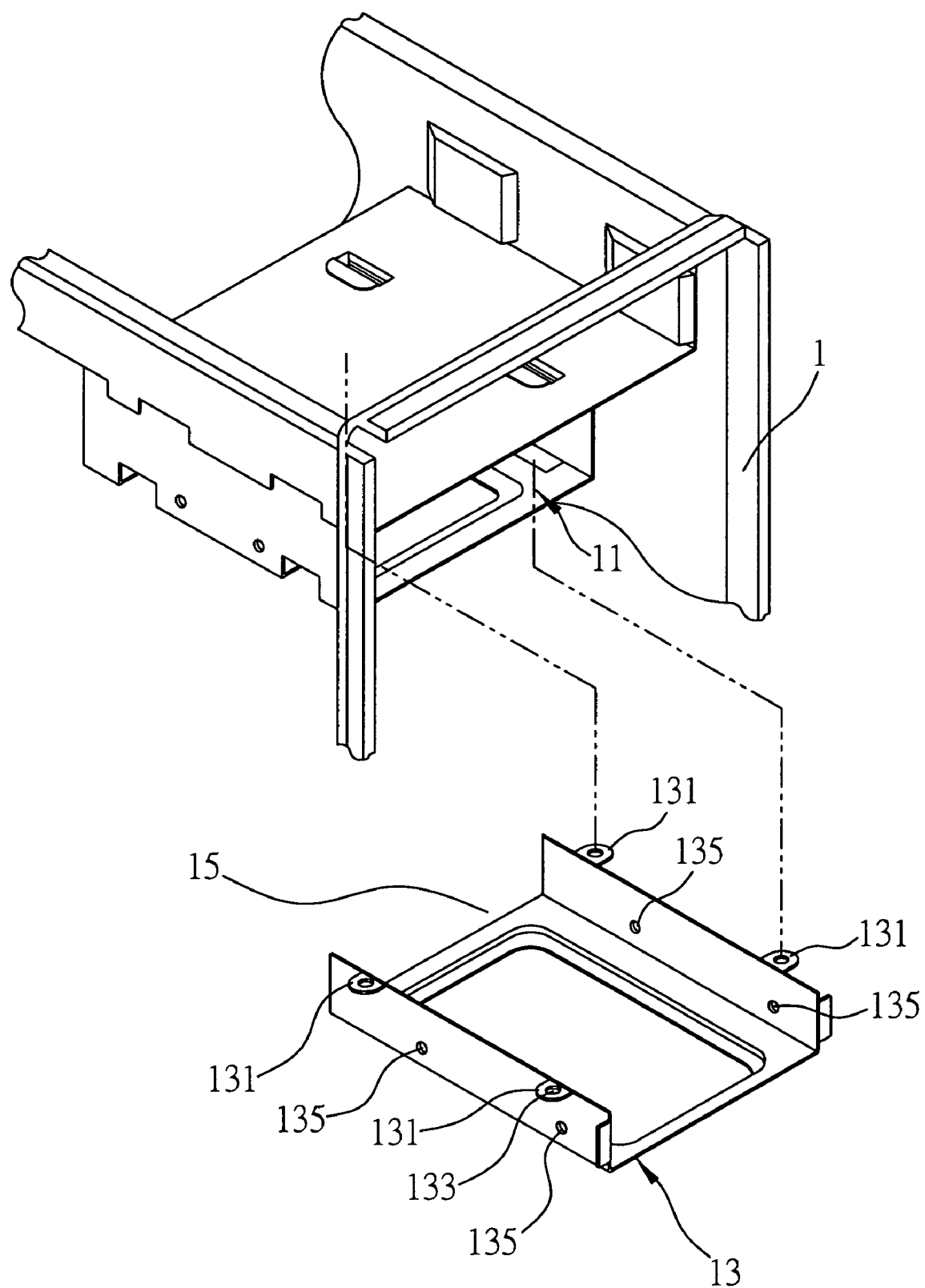
FIG. 1 is a perspective, exploded view illustrating installing of a conventional disc drive frame within a computer casing.
Figure 2:
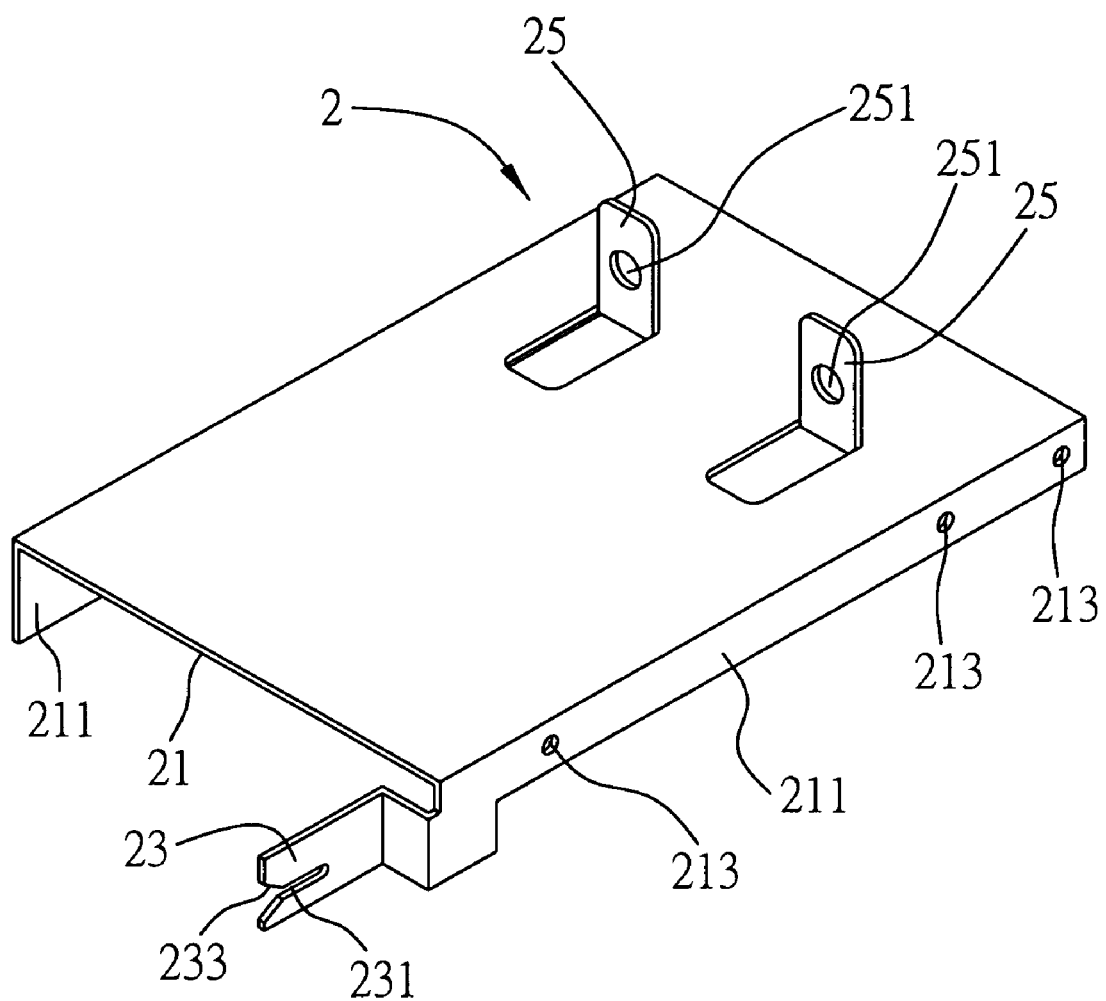
FIG. 2 is a schematic diagram illustrating a disc drive carrier unit according to the invention.

FIG. 2 is a schematic diagram illustrating a disc drive carrier unit according to the invention. As shown in FIG. 2, a disc drive carrier unit 2 comprises a frame 21, a second positioning piece 23 and two second fixation pieces 25. The frame 21, the second positioning piece 23 and the second fixation pieces 25 are made of conductive metal panels. The metal panels may be made of material selected from a group consisting of iron, copper, nickel, alloy of nickel and copper, alloy of nickel, copper and iron, or alloy of copper, nickel and gold. To manifest the features of the invention, conventional structures, such as computer casing, disc drive, and so on irrelevant to the invention are not further described herein.

The frame 21 is used to encompass and secure a disc drive, such as a floppy disc drive, a hard disc drive, or optical drive (not shown), like a CD-ROM drive or a DVD-ROM drive. The frame 21 has an "n"-shaped cross-sectional surface having all edges at right angles to one another and two side panels 211 formed by stamping on two lateral sides thereof. The two side panels 211 have mounting holes 213 thereon corresponding in positions to standard lockholes of the disc drive.

The second positioning piece 23 is formed on one end of the frame 21 by bending a prolonged portion of one of the side panels 211 of the frame 21. The second positioning piece 23 comprises a notch 231 with a chamfer 233 on an exterior end thereof.

The second fixation pieces 25 are respectively formed as a result of opening mounths on the surface of the frame 21 by bending surplus material of the mouths upwards on the surface of the frame 21. In addition, each of the second fixation pieces 25 has a mounting hole 251 for insertion with a screw. The second fixation pieces 25 are perpendicular to the second positioning piece 23.

Figure 3:
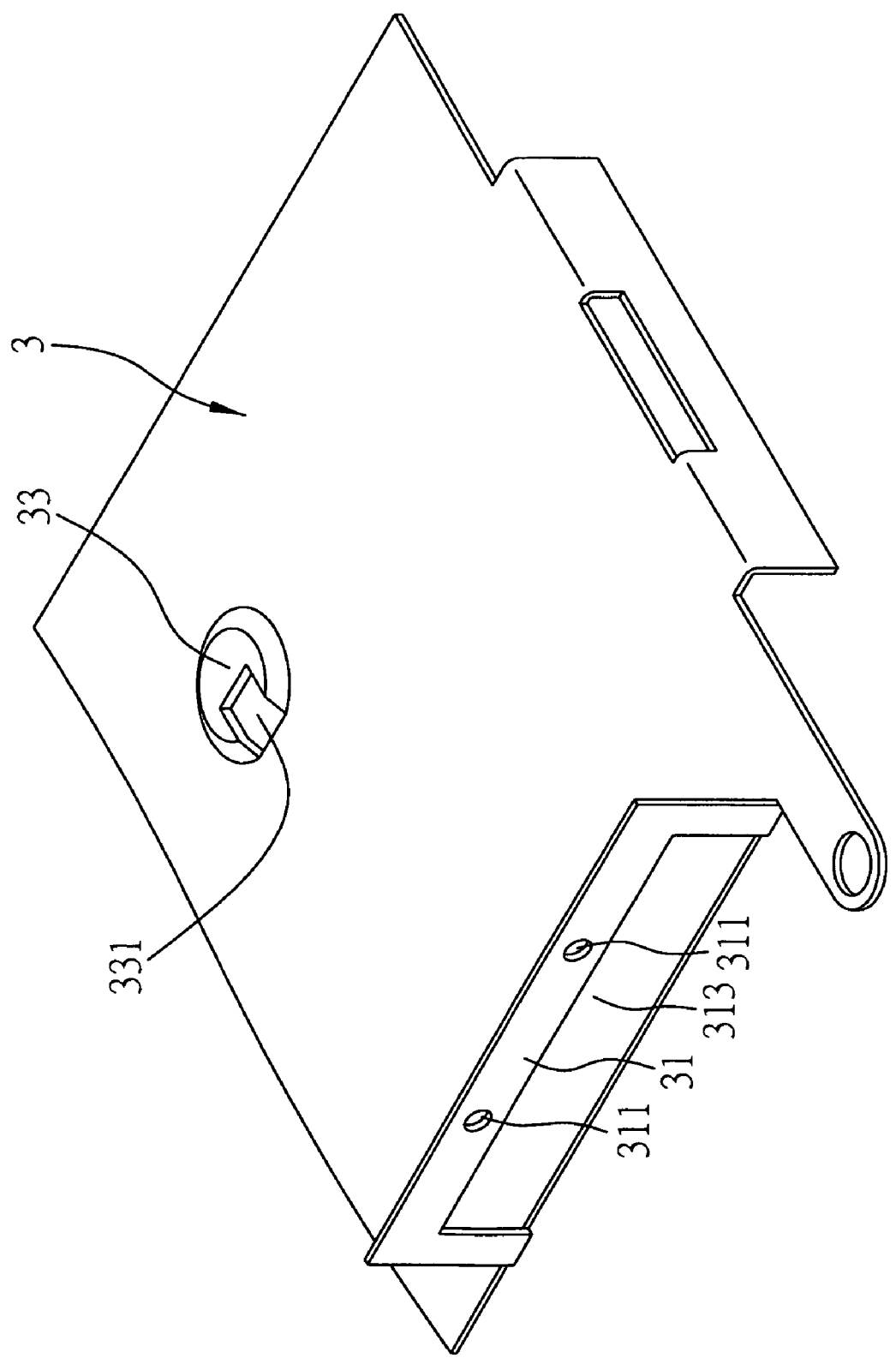
FIG. 3 is a schematic diagram illustrating a surface for installing the disc drive carrier unit according to the invention.

FIG. 3 is a schematic diagram illustrating an installation surface for installing the disc drive carrier unit according to the invention. As shown in the diagram, the disc drive carrier unit 2 is mounted on the installation surface, and the installation surface 3 may be any surface inside the computer casing, a bottom surface of another disc drive carrier unit, or other surfaces of the frame inside the computer casing. Since the installation surface 3 inside the computer 3 is a special structural design for matching with the disc drive carrier unit 2, it is reasonably mounted on any object or appropriate location inside the computer casing. Therefore, the embodiment of the invenstion merely illustrates the structure of the installation surface 3 inside the computer casing, no specific object or location will be described further.

The installation surface inside the computer 3 comprises at least a first positioning piece 33 and a first fixation piece 31, both are perpredicular to each other. The first fixation piece 31 is formed on one end of the installation surface 3 by stamping a hollow space 313, followed by bending upwards, so that the size of the hollow space 313 is sufficient for the frame 21 to pass through for installation. In addition, the first fixation piece 33 has a mounting hole 251 thereon corresponding to two holes 311. The first positioning piece 33 is formed by stamping on the installation surface 3 and with at least a hollow space 331 towards a side of the first fixation piece 31 for engaging with the notch 231 of the second positioning piece 23. It is found that the first positioning piece 33 and the first fixation piece 31 are both formed on the installation surface 3, corresponding in position to the second positioning piece 23 and the second fixation pieces 25 on the frame 21. The second positioning piece 23 is narrower than the first positioning piece 33. In other words, the width of the first positioning piece 33 is longer than that of the second positioning piece 23, preferably, the width of the first positioning piece 33 is twice as long as that of the second positioning piece 23.

Figure 4:
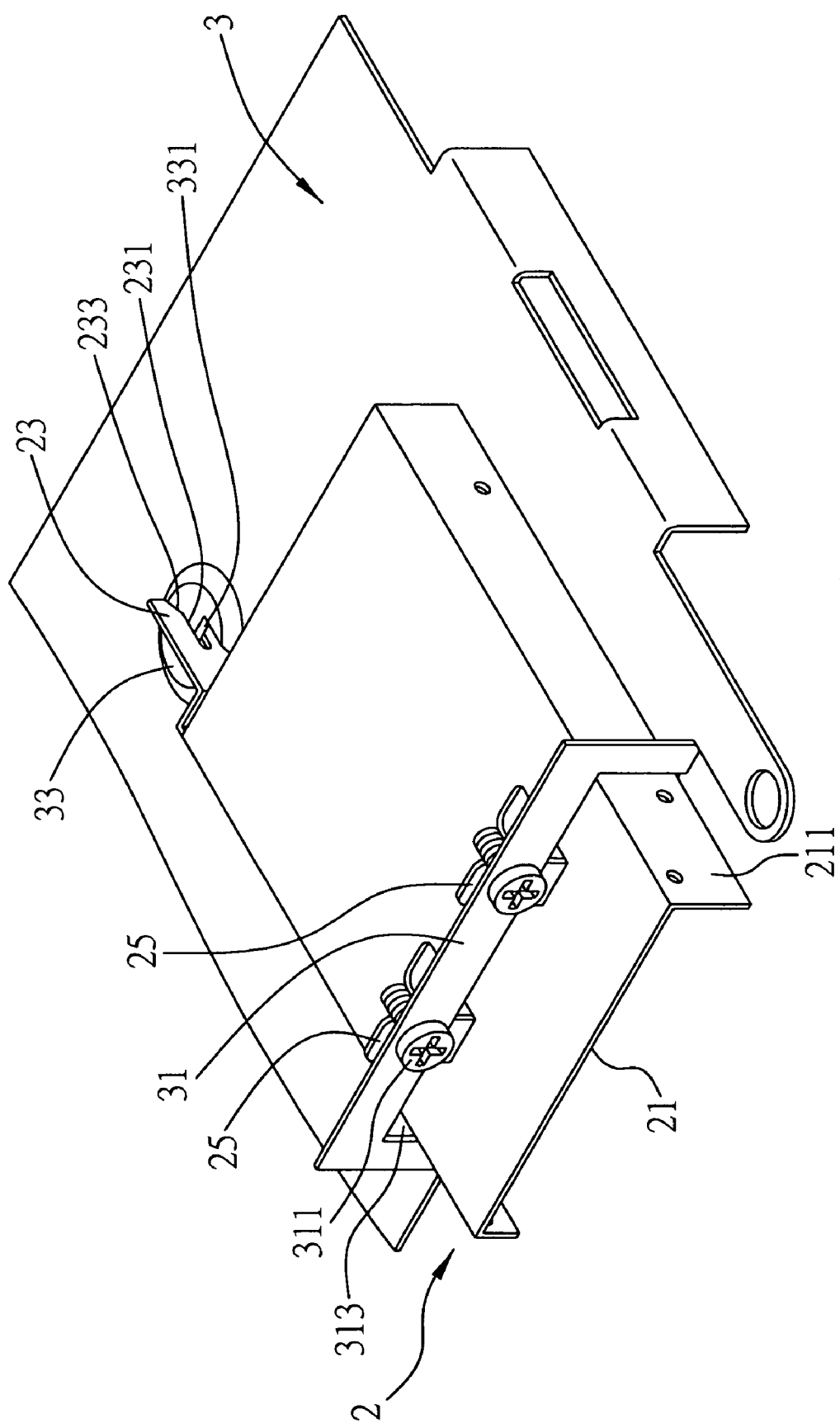
FIG. 4 is a perspective view showing operation of the disc drive carrier unit after being installed on the installation surface according to the invention.

FIG. 4 is a perspective view showing operation of the disc drive carrier unit after being mounted on the installation surface according to the invention. After the disc drive or the CD-ROM drive (not shown) is secured to the frame 21 of the disc drive carrier unit 2, the frame 21 is inserted through the hollow space 313 tand over the installation surface 3. The notch 231 of the second positioning piece 23 pierces through the hollow space 331 and engages with the first positioning piece 33, such that the two second locating pieces 25 correspondingly lean against the first locating surface 31, so as to secure the second fixation pieces 25 are secured to the first fixation piece 31 via insertion of the screws 4 through the holes. The chamfer 233 on the exterior end of the notch facilitates a smooth operation of the enagaging action. Moreover, the second positioning piece 23 provides the engaging function to replace conventional assembly technology for ease of assembly and dismantle, so as to reduce the assembly cost.

Figure 5:
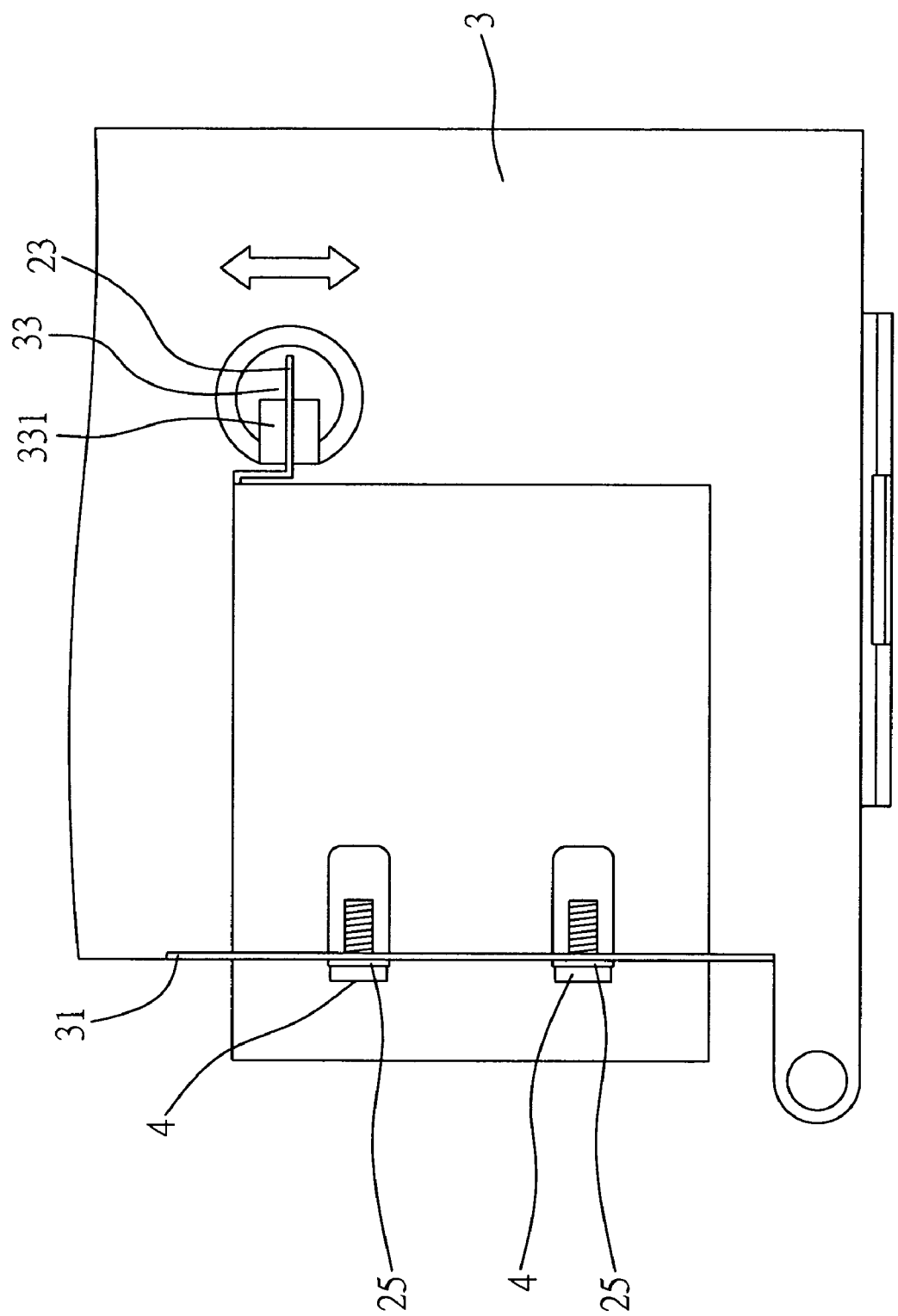
FIG. 5 is a top view of FIG. 4.

As shown in FIG. 5, when the frame 21 of the disc drive carrier unit 2 inserts through the hollow space 313 and over the installation surface 3, the width of the first positioning piece 33 is at least twice as long as that of the second positioning piece 23, allowing the second positioning piece 23 to horizontally shift with respect to the first positioning piece 33 in a horizontal shifting adjustment within the common misalignment by stamping. So, even if the positions of the two mounting holes 251 on the two second fixation pieces 25 are not aligned with the two holes 311 on the first fixation piece 31, the second positioning piece 23 can be horizontally shifted with respect to the first positioning piece 33, to adjust the positions of the holes. Consequently, the invention enables broadening of the permitted range of misaligment, so as to largely reduce the defective product rate.

As described in the above embodiment, a majority of disc drive is encompassed by the disc drive carrier unit 2 and assembled on the installation surface 3. The frame 21, the second positioning piece 23 and the second fixation pieces 25 are made of conductive metal panels, so that the invention has a mask effect on the installed disc drive to avoid electromagnetic interference. In addition, the grounding effect achieved via enagagement of the second positioning piece 23 is used to avoid electrostatic discharge.

In conclusion, the invention provides the disc drive carrier unit, which enables the second positioning piece to provide the engaging function for ease of assembly/disassembly to replace conventional assembly technology, so as to further reduce the assembly cost. In addition, the disc drive carrier unit enables the second positioning piece to shift horizontally within the permitted range of misalignment by stamping, so as to reduce the defective product rate. Moreover, the frame, the second positioning piece and the second fixation pieces of the invention are made of conductive metal panels, thereby the mask effect of disc drive carrier unit avoids occureence of electromagnetic interference. In addition, the grounding effect achieved via engagment of the second positioning piece is used to avoid electrostatic discharge. Consequently, the disc drive carrier unit of the invention is disclosed therein to solve the drawbacks of conventional technology, and provide a variety of substantial effects to increase the industrial applicability.

It is of course to be understood that the disclosed embodiments are merely exemplary of the invention that may be embodied in various forms. The substance of the invention is broadly defined as claimed below. In the event any technical embodiments or methods completed by those skilled in the art are found completely identical to the definitions as claimed below, or can be regarded as an equivalent substitution, such embodiments or methods are regarded as within the intended scope of the invention.

What is claimed is:

1. A disc drive carrier unit, installed on an installation surface of a computer casing, wherein the installation surface comprises at least a first positioning piece and a first fixation piece perpendicular to each other, the disc drive carrier unit comprising:
   a frame for encompassing and securing a disc drive over the installation surface;
   a second positioning piece, formed on one end of the frame for engaging with the first positioning piece; and
   at least a second fixation piece, formed on a surface of the frame and is being perpendicular to the second positioning piece for securing to the first fixation piece in place.

2. The disc drive carrier unit of claim 1, wherein the second positioning piece has a notch to engage with the first positioning piece.

3. The disc drive carrier unit of claim 1, wherein the second positioning piece is narrower than the first wedging surface, so that the second positioning piece shifts horizontally with respect to the first positioning piece.

4. The disc drive carrier unit of claim 1, wherein the second locating piece has at least a mounting hole for insertion with a screw.

5. The disc drive carrier unit of claim 1, further comprising two second fixation pieces, each having a mounting hole for insertion with a screw.

6. The disc drive carrier unit of claim 1, wherein the frame has an "n"-shaped cross-sectional surface.

7. The disc drive carrier unit of claim 1, wherein the frame, the second positioning piece and the second fixation pieces are made of conductive metal panels.

8. The disc drive carrier unit of claim 1, wherein the installation surface is formed on an inner surface of the computer casing.

9. The disc drive carrier unit of claim 1, wherein the installation surface is formed on a frame surface within the computer casing.

10. The disc drive carrier unit of claim 2, wherein the notch is formed with a chamfer on an exterior end of the notch.

11. The disc drive carrier unit of claim 6, wherein two sides of the frame are formed with mounting holes corresponding in position to lockholes of the disc drive.

12. The disc drive carrier unit of claim 7, wherein the metal panels are selected from a group consisting of iron, copper, nickel, alloy of nickel and copper, alloy of nickel, copper and iron, and alloy of copper, nickel and gold.

* * * * *